(12) United States Patent
Desai et al.

(10) Patent No.: US 11,120,306 B2
(45) Date of Patent: Sep. 14, 2021

(54) EDGE-BASED ADAPTIVE MACHINE LEARNING FOR OBJECT RECOGNITION

(71) Applicant: INTERNATIONAL BUSINESS MACHINES CORPORATION, Armonk, NY (US)

(72) Inventors: Nirmit V. Desai, Yorktown Heights, NY (US); Dawei Li, Bethlehem, PA (US); Theodoros Salonidis, Boston, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 107 days.

(21) Appl. No.: 15/801,804

(22) Filed: Nov. 2, 2017

(65) Prior Publication Data
US 2018/0114334 A1 Apr. 26, 2018

Related U.S. Application Data

(63) Continuation of application No. 15/727,785, filed on Oct. 9, 2017.
(Continued)

(51) Int. Cl.
*G06T 7/70* (2017.01)
*G06K 9/62* (2006.01)
(Continued)

(52) U.S. Cl.
CPC ......... *G06K 9/6263* (2013.01); *G06K 9/4604* (2013.01); *G06K 9/4628* (2013.01);
(Continued)

(58) Field of Classification Search
CPC .. G06K 9/6263; G06K 9/4628; G06K 9/6271; G06K 9/6259; G06K 9/4604;
(Continued)

(56) References Cited

U.S. PATENT DOCUMENTS 9,443,320 B1 * 9/2016 Gaidon ............... G06K 9/3233
9,727,826 B1    8/2017 Lindstrom
(Continued)

OTHER PUBLICATIONS

A. Krizhevsky, et al., "ImageNet Classification with Deep Convolutional Neural Networks" Communications of the ACM, vol. 60 No. 6, Jun. 2017, p. 1-9.
(Continued)

*Primary Examiner* — John W Lee
(74) *Attorney, Agent, or Firm* — Cantor Colburn LLP; Anthony Curro

(57) ABSTRACT

Examples of techniques for adaptive object recognition for a target visual domain given a generic machine learning model are provided. According to one or more embodiments of the present invention, a computer-implemented method for adaptive object recognition for a target visual domain given a generic machine learning model includes creating, by a processing device, an adapted model and identifying classes of the target visual domain using the generic machine learning model. The method further includes creating, by the processing device, a domain-constrained machine learning model based at least in part on the generic machine learning model such that the domain-constrained machine learning model is restricted to recognize only the identified classes of the target visual domain. The method further includes computing, by the processing device, a recognition result based at least in part on combining predictions of the domain-constrained machine learning model and the adapted model.

8 Claims, 11 Drawing Sheets

Related U.S. Application Data

(60) Provisional application No. 62/411,900, filed on Oct. 24, 2016, provisional application No. 62/413,008, filed on Oct. 26, 2016.

(51) Int. Cl.
| | |
|---|---|
| *G06K 9/66* | (2006.01) |
| *G06N 5/04* | (2006.01) |
| *G06N 20/00* | (2019.01) |
| *G06K 9/46* | (2006.01) |
| *G06N 99/00* | (2019.01) |
| *G06Q 10/00* | (2012.01) |

(52) U.S. Cl.
CPC ......... *G06K 9/6259* (2013.01); *G06K 9/6271* (2013.01); *G06K 9/66* (2013.01); *G06N 5/04* (2013.01); *G06N 20/00* (2019.01); *G06T 7/70* (2017.01); *G06Q 10/00* (2013.01)

(58) Field of Classification Search
CPC . G06K 9/66; G06N 20/00; G06N 5/04; G06T 7/70; G06Q 10/00
See application file for complete search history.

(56) References Cited

U.S. PATENT DOCUMENTS

| | | | |
|---|---|---|---|
| 10,140,515 B1* | 11/2018 | Waldo | G06K 9/6273 |
| 2005/0169529 A1 | 8/2005 | Owechko | |
| 2009/0220156 A1* | 9/2009 | Ito | G06K 9/00248 382/201 |
| 2012/0022952 A1 | 1/2012 | Cetin et al. | |
| 2013/0097246 A1 | 4/2013 | Zifroni | |
| 2013/0125069 A1 | 5/2013 | Bourdev et al. | |
| 2015/0135238 A1* | 5/2015 | Wickenkamp | H04N 21/4122 725/80 |
| 2016/0042252 A1 | 2/2016 | Sawhney et al. | |
| 2016/0103932 A1* | 4/2016 | Sathish | G06F 3/04847 715/767 |
| 2016/0191958 A1 | 6/2016 | Nauseef et al. | |
| 2017/0213154 A1 | 7/2017 | Hammond et al. | |
| 2017/0220903 A1 | 8/2017 | Hertzmann et al. | |
| 2018/0114098 A1 | 4/2018 | Desai et al. | |
| 2018/0114099 A1 | 4/2018 | Desai et al. | |
| 2018/0114100 A1 | 4/2018 | Desai et al. | |
| 2018/0114101 A1 | 4/2018 | Desai et al. | |
| 2018/0114332 A1 | 4/2018 | Desai et al. | |
| 2018/0114334 A1 | 4/2018 | Desai et al. | |

OTHER PUBLICATIONS

A. Mahendran, et al., "Understanding Deep Image Representations by Inverting Them", EEE Conference Computer Vision and Pattern Recognition (CVPR), Oct. 15, 2015, p. 1-9.
A. Roshan Zamir, et al., "GPS-TAG Refinement using RandomWalks with an Adaptive Damping Factor", IEEE Conference on Computer Vision and Pattern Recognition (CVPR), Jun. 2014, p. 1-8.
D. Li, et al., "DeepCham: Collaborative Edge-Mediated Adaptive Deep Learning for Mobile Object Recognition", IEEE/ACM Symposium on Edge Computing (SEC), Oct. 27-28, 2016, p. 1-13.
D. Li, et al., "Demo: Lehigh Explorer Augmented Campus Tour (LACT)", Mars, ACM, vol. 14, No. 6, Jun. 16, 2014, p. 1-2.
D. Li, et al., "EMOD: An Efficient On-Device Mobile Visual Search System", Proceedings of the 6th ACM Multimedia Systems Conference, Mar. 2015, p. 1-12.
G. Takacs, et al., "Outdoors Augmented Reality on Mobile Phone using Loxel-Based Visual Feature Organization", ACM, MIR, Oct. 30-31, 2008, pp. 1-8.
Google, whitepages, "Google Instant, Behind the Scenes", Sep. 2010, p. 1-6.
J. Donahue, et al., "DeCAF: A Deep Convolutional Activation Feature for Generic Visual Recognition", Proceedings of the 31st International Conference on Machine Learning, vol. 32, 2014, p. 1-9.
J. Hoffman, et al., "One-Shot Adaptation of Supervised Deep Convolutional Models" Computer Science, Dec. 2013, p. 1-10.
J. Hoffman, "Domain Adaptation Project" EECS, Berkeley, Whitepages, p. 1-4.
J. Johnson, et al., "Love Thy Neighbors: Image Annotation by Exploiting Image Metadata" IEEE International Conference on Computer Vision (ICCV), Dec. 7-13, 2015, p. 1-9.
K. Saenko, et al., "Adapting Visual Category Models to New Domains", springer-Verlag Berlin, Heidelberg, 2010, p. 1-14.
M. Abadi, et al., "TensorFlow: Large-Scale Machine Learning on Heterogeneous Distributed Systems", Google Research Whitepaper, 2015, p. 1-19.
N. D. Lane, et al., "Can Deep Learning Revolutionize Mobile Sensing?", ACM, Feb. 12-13, 2015, p. 1-6.
N. D. Lane, et al., "DeepEar: Robust Smartphone Audio Sensing in Unconstrained Acoustic Environments using Deep Learning", ACM, Ubi Comp, Sep. 7-11, 2015, p. 1-12.
P. H. Kahn, et al., "Robotic Pets in the Lives of Preschool Children", Late Breaking Results Paper, ACM, Apr. 24-29, 2004, p. 1-4.
P. Jain, et al., "OverLay: Practical Mobile Augmented Reality", ACM, vol. 15, No. 5, May 18-22, 2015, p. 1-14.
R. Girshick, et al., "Rich feature hierarchies for accurate object detection and semantic segmentation Tech Report (V5)", arXiv.org, Computer Visuion and Pattern Recognition, Nov. 11, 2013, p. 1-21.
S. Lodi, et al., "L2-SVM Training with Distributed Data" Mates, Springer-Verlag, 2009, p. 1-2.
Y. Jia, et al., "Caffe: Convolutional Architecture for Fast Feature Embedding", ACM, Nov. 3-7, 2014, p. 1-4.
Y. Li, et al., "Landmark Classification in Large-scale Image Collections", IEEE 12th International Conference on Conference: Computer Vision, Nov. 2009, p. 1-8.
Yangqing Jia, "Cafte Model Zoo", Whitepages, GitHub,Tutorial Caffe berkeley vision, 2012, p. 1-3.
D. Li, et al., "DeepCham: Collaborative Edge-Mediated Adaptive Deep Learning for Mobile Object Recognition", IEEE/ACM Symposium on Edge computing (SEC), Dec. 2016, p. 1-13.

* cited by examiner

Algorithm 2 Enhanced Bounding Boxes Strategy

Input: L is the list of boxes in descending order of scores
Output: $L_{top}$ is the list of the top 5 selected boxes 1: function SELECT(L)
2:     $L_{top} \leftarrow \emptyset$
3:     $region_{dist} \leftarrow [0,0,0,0]$     △ region distribution of $L_{top}$
4:     for each $b \in L$ do
5:         if $L_{top}.size \geq j$ then
6:             break
7:         if b is too large || b is too small then
8:             continue
9:         if $\neg$ Equal_Region(b, $region_{dist}$) then
10:        continue
11:        Update($region_{dist}$)
12:        $L_{top}$.add(b)
13:     Add_Margin($L_{top}$)
14:     return $L_{top}$

*FIG. 5*

Algorithm 1 Distributed Image Pruning (Worker Algorithm)

Input: $n_f$ = the number of images to retain on the device
$S_e$ = the set number of images features extracted from $n_r$ candidate images
$S_c$ = the set number of $n_c$ existing image features received from master
$t$ = synchronization allowance variable

Output: $Img_f$ is the set of retained images

1: function REMOVEEXISTING($S_e$, $S_c$)
2:    for each item in $S_e$ do
3:       search the nearest neighbor $f_{nn}$ of item $S_c$
4:       remove $f_{nn}$ from $S_c$
5:
6: function PRUNING ($S_e$, $S_c$, $n_f$)
7:    if there are synchronized workers then
8:       $\hat{S}_f$ = clusterCentroid($S_c$, $n_f$ + $n_c$ + $t$)
9:    else
10:      $\hat{S}_f$ = clusterCentroid($S_c$, $n_f$ + $n_c$ + $t$)
11:      RemoveExisting($\hat{S}_f$, $S_c$)
12:      send $\hat{S}_f$ to master
13:    if there are synchronized workers then
14:      updateFromMaster($\hat{S}_f$)
15:    $Img_f$ = ids of images that are nearest neighbors to centroids in $\hat{S}_f$
16:    return $Img_f$

*FIG. 6*

EDGE-BASED ADAPTIVE MACHINE LEARNING FOR OBJECT RECOGNITION

DOMESTIC PRIORITY

This application is a continuation of U.S. patent application Ser. No. 15/727,785, entitled "EDGE-BASED ADAPTIVE MACHINE LEARNING FOR OBJECT RECOGNITION," filed Oct. 9, 2017, which claims the benefit of U.S. Provisional Patent Application No. 62/411,900, entitled "ADAPTIVE MACHINE LEARNING FOR OBJECT RECOGNITION," filed Oct. 24, 2016, and U.S. Provisional Patent Application No. 62/413,008, entitled "ADAPTIVE MACHINE LEARNING FOR OBJECT RECOGNITION," filed Oct. 26, 2016, the disclosures of which are incorporated by reference herein in their entirety.

BACKGROUND

The present invention generally relates to object recognition and, more particularly, relates to edge-based adaptive machine learning for object recognition.

Contemporary mobile devices, such as smartphones, tablets, mobile robots, etc., can be equipped with capable cameras and powerful processors that enable mobile computer vision applications such as augmented reality, self-driving cars, robotic pets, and the like. The core functionality underlying many of these applications is object recognition (i.e., running computer programs to identify objects in an image or video sequence).

Some existing object recognition systems use techniques that operate robustly for specialized tasks (e.g., wine label reading, product label reading, OCR-based language translation, etc.). Existing augmented reality (AR) systems use sensor techniques for context inference combined with computer vision algorithms for recognition of image objects taken by devices. These systems can operate robustly under the assumption of specialized tasks or controlled environments (e.g., matching test images to a set of training images that were taken under similar conditions in the same location and exist in an image database.

SUMMARY

One or more embodiments of the present invention provide methods, systems, and/or computer program products for adaptive object recognition for a target visual domain given a generic machine learning model.

According to one or more embodiments of the present invention, a computer-implemented method for adaptive object recognition for a target visual domain given a generic machine learning model includes creating, by a processing device, an adapted model and identifying classes of the target visual domain using the generic machine learning model. The method further includes creating, by the processing device, a domain-constrained machine learning model based at least in part on the generic machine learning model such that the domain-constrained machine learning model is restricted to recognize only the identified classes of the target visual domain. The method further includes computing, by the processing device, a recognition result based at least in part on combining predictions of the domain-constrained machine learning model and the adapted model.

Additional features and advantages are realized through one or more embodiments of the present invention. Other aspects are described in detail herein and are considered a part of the disclosure. For a better understanding of the embodiments of the present invention with the advantages and the features, refer to the following description and to the drawings.

BRIEF DESCRIPTION OF THE DRAWINGS

The subject matter that is regarded as the invention is particularly pointed out and distinctly claimed in the claims at the conclusion of the specification. The foregoing and other features, and advantages thereof, are apparent from the following detailed description taken in conjunction with the accompanying drawings in which:

FIG. 5 depicts an example of pseudo code for an enhanced bounding boxes strategy for object recognition according to one or more embodiments of the present invention;

FIG. 6 depicts an example of pseudo code for distributed image pruning for distributed data clustering according to one or more embodiments of the present invention.

DETAILED DESCRIPTION

Figure 1:
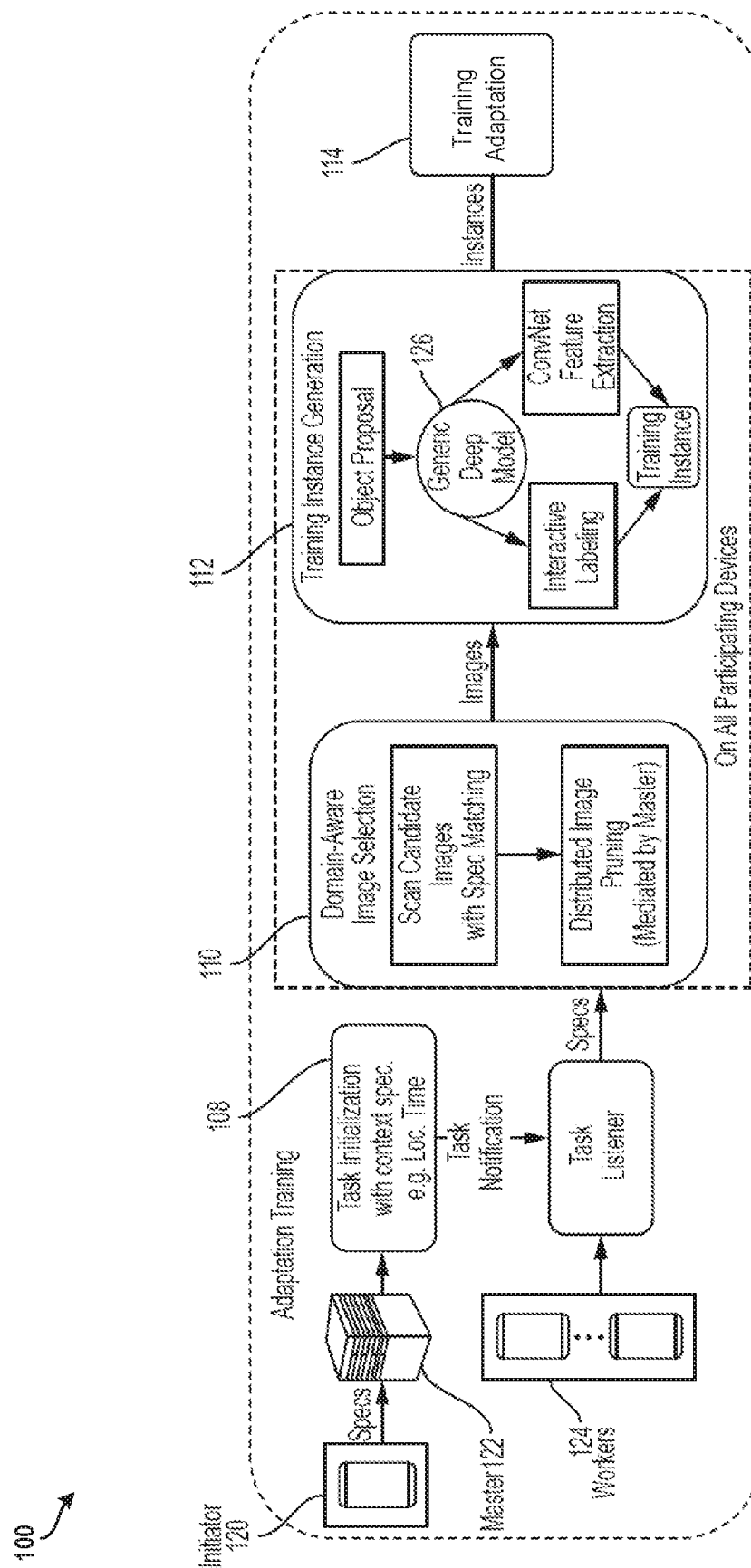
FIG. 1 depicts a block diagram of a system for adaptation training according to one or more embodiments of the present invention.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies relevant to aspects of the disclosed system for providing adaptive machine learning for edge-based object recognition, edge-based object recognition is the problem of recognizing objects in images and videos locally (e.g., at an edge device in a network of devices). Locally can mean on the same device that generates the images or videos or on another device in its proximity (e.g., connected over a local area network) without having to transport the visual data over the Internet. A visual domain is a specific visual environment defined by a subset of the universe of objects present in the environment, lighting conditions, camera parameters, location, time, and other attributes that affect object recognition. Adaptive machine learning is the technique of adapting machine learning models to a specific visual domain. Collaborative adaptive training is an adaptive machine learning technique wherein the adaptation of the machine learning model is achieved by collaboration among multiple devices. Collaborative adaptive recognition is an application of adapted models trained in collaborative adaptive machine learning training for object recognition. The machine learning algorithm can be a deep learning algorithm or other statistical or knowledge-based learning algorithm.

Typical object recognition tasks do not occur locally. Instead, existing general object recognition tasks typically send images captured by the mobile devices to backend systems such as powerful server machines and/or graphical processing units (GPUs) in a cloud environment that perform the compute-intensive image processing tasks. In particular, these backend systems extract image features and match them to those of annotated object images in a database. These image-matching systems rely on exact query images and manual labeling of an initial population of annotated images in a database. Furthermore, they send raw images from devices to the servers and therefore incur high network bandwidth and energy consumption and can also be a potential violation of user privacy. Most existing systems also do not provide automated, continuous methods for generating the labeled image databases (i.e. the database is constructed offline after collecting data for a pre-specified location).

Recognition accuracy of existing object recognition methodologies can degrade when used in daily mobile scenarios due to challenges in terms of model inclusiveness, visual domain shift, and high resource costs. For example, regarding model inclusiveness, it is hard to know in advance what objects are available in an environment to pre-train an inclusive recognition model for such an environment. Regarding visual domain shift, visual domains are highly variable. Changes in image resolution, lighting, background, viewpoint, and post-processing (or any combinations of the above) can adversely impact the accuracy of computer vision algorithms. In terms of high resource costs, existing object recognition techniques experience high cost in terms of bandwidth, energy, or privacy due to the requirement for uploading (e.g., over the Internet) raw image data to powerful server machines. Moreover, existing object recognition techniques experience high computational costs and time required for training machine learning models.

The model inclusiveness issue can be addressed using machine learning instead of image matching methods. Such techniques train a model represented as a multi-level neural network with very large image datasets. Specifically, the recently advanced Convolutional Neural Networks (CNNs) achieves the state-of-the-art performance on large-scale object recognition tasks (e.g., the 1000-class object classification task in the ImageNet Large Scale Visual Recognition Challenge (ILSVRC)). Such large-scale recognition models can be trained to recognize most objects in real-life usage. However, a machine learning neural network trained using such large-scale datasets does not guarantee sufficient recognition accuracy in each target visual domain (i.e., the context where the machine learning model is applied to). For example, it can recognize the inanimate animal specimens displayed in a museum but not those alive in a zoo.

Figure 10:
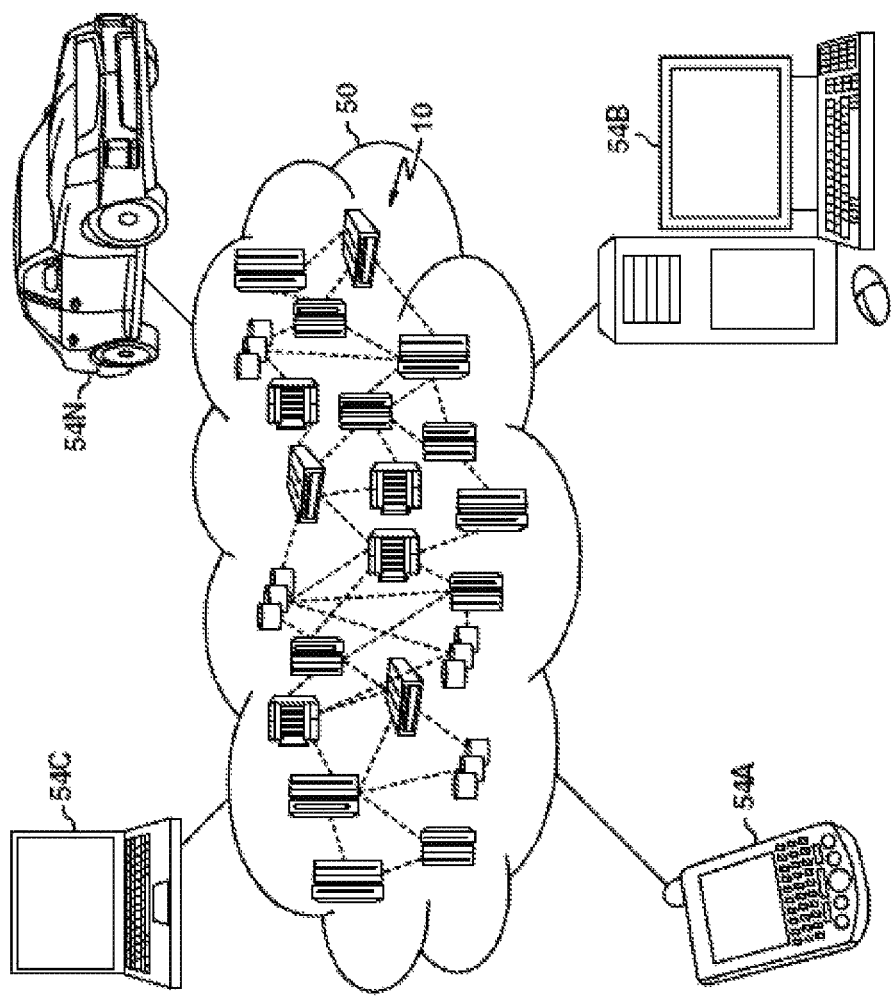
FIG. 10 depicts a cloud computing environment according to one or more embodiments of the present invention.

Typically machine learning models are large and perform object recognition in powerful backend server machines and/or cloud environments (e.g., the cloud computing environment 50 described in FIG. 10). Simplified versions of machine learning models have also been ported to run on mainstream mobile platforms such as ANDROID® and IOS®. These models have less accuracy than their backend server counterparts and/or are designed to perform specialized object recognition tasks (e.g. OCR language translation, etc.).

Object recognition accuracy of a generic machine learning model can be improved using supervised machine learning model adaptation techniques. These adaptation techniques assume that the training data of the target domain is already available. An effective machine learning model adaptation requires high-quality training instances (i.e., good image feature and correct image label) captured from the target visual domain. However, in an object recognition task, obtaining such high-quality training instances is challenging due to the highly variable visual domains. An additional major problem is that machine learning model training approaches assume that training images must be uploaded to a backend server where machine learning model adaptation will occur. This can incur high cost in terms of bandwidth energy and user privacy.

In summary, no existing object recognition approach effectively addresses the challenges of inclusiveness, varying visual domains and cost in terms of mobile bandwidth, energy, and user privacy. In addition, no existing approach provides an efficient way for online training (either in terms of building the image database in case of image matching approach, or in terms of creating training instances and model adaptation in the machine learning approach).

Embodiments of the present invention relate to machine learning-based approaches that aim to solve the challenging object recognition problems described herein. Embodiments of the present invention create domain-specific adaptation training instances using in-situ images from participating devices and enable adaptive machine learning in both personal spaces (e.g., home) and public spaces (e.g., museums, etc.).

Embodiments of the present invention associate an adapted model with a target visual domain and include an adaptation training procedure and an object recognition procedure. The adaptation training procedure generates training instances using images that match the contextual specification of the target visual domain. Given an image matching the target visual domain, an object detection mechanism extracts existing objects, and, for each object, a generic machine learning model stored in each device is used to generate machine learning model features and label recommendations to human users who then select a correct label. Machine learning features and human selected labels form training instances that are used to train an adapted model which corresponds to the target visual domain. This enables devices to share training instances and adapted models through an adaptation database that can be located at a central location or distributed among the devices. The object recognition procedure uses an existing adapted model in combination with a domain-aware adaptation of the stored generic machine learning model.

Adaptation training and object recognition according to embodiments of the present invention can be performed on mobile devices or on a backend server. This enables implementation of the embodiments of the present invention according to a wide spectrum of bandwidth and energy efficiency and privacy concerns. The machine learning model adaptation in mobile environments incurs minimal human effort for creating high-quality training instances, respects user privacy, and is resource efficient.

The advantages over prior approaches are that the embodiments of the present invention address at least the four challenges of object recognition outlined above. In particular, the embodiments of the present invention provide inclusiveness using a machine learning model. The embodiments of the present invention also adapt to variations in visual domains by generating and sharing training instances and adapted models among multiple devices matching the target visual domain. Moreover, the adaptation training and object recognition procedures of the embodiments of the present invention can be executed locally to save mobile network bandwidth, energy, and preserve user privacy. Additionally, the embodiments of the present invention enable online adaptation training using a machine learning approach. These and other advantages will be apparent from the description that follows.

In one or more embodiments of the present invention, a method for collaborative adaptive model training for mobile visual domains is provided. According to embodiments of the invention, a machine learning model is adapted on a set of devices using labeled local images stored on the devices without requiring the devices to export raw images. The machine learning model can be present on the device or can be downloaded from a server. The local images used for adaptation may not already be labeled, in which case an interactive labeling technique can be employed to have human users provide labels. The adaptation task can determine a set of worker devices containing a set of images that match the target visual domain specification.

According to one or more embodiments of the present invention, the adaptation task can be distributed to worker devices. Additionally or alternatively, the one or more embodiments of the present invention can utilize a cloud computing environment (e.g., the cloud computing environment 50) to perform the distribution described herein. A subset of images to be labeled by each worker device can be chosen using a set of generic features extracted from the images and a distributed clustering algorithm. A plurality of object images can be extracted from each selected image using an object detection algorithm. Label suggestions and features to the human user can be automatically generated for each object image using the generic machine learning model. A set of training instances can be generated using features extracted from the object image and the human-selected label. An adapted model can be trained using the training instances and features for the target visual domain. The training instances and the adapted model can be stored in an adaptation database.

In one or more embodiments of the present invention, a method for adaptive object recognition for visual domains is provided. A machine learning model can be adapted for the target visual domains and can be applied for object recognition. This can utilize obtaining a contextual specification of the target visual domain. The adapted model can be identified and loaded from an adaptation database matching the specification of the target visual domain. The unadapted model can be applied to cater to the target visual domain, and the results of this model can be fused with the results of the adapted model for classifying objects.

In one or more embodiments of the present invention, a method and system for contextual object detection using mobile cameras is provided. Contextual object detection detects one or more objects along with their position within an image in the context of a target visual domain without necessarily recognizing the identity or type of the objects. Object proposals are one or more candidate objects detected along with their position in an image, of which only a subset is eventually accepted as objects. In the case of an example method, the method can include: partitioning a geographical area in multiple contextual domains, each domain characterized by a maximum number k of object proposals; capturing a digital image (I) through a mobile user camera; determining the current mobile contextual domain D; determining an upper bound k on number of objects of interest based on the mobile contextual domain D; computing an image set M using multiple scaled copies for image I; identifying a set of object bounding boxes using the upper bound k and a baseline object proposal algorithm for each scaled image copy in set M; and/or refining the set of bounding boxes by merging the boxes of scaled image copies to satisfy the constraint k.

FIG. 1 depicts a block diagram of a system 100 for an adaptive training procedure according to one or more embodiments of the present invention. The system 100 is configured to create new adapted models or enhances existing adapted models for a target visual domain. The various components, modules, engines, etc. described regarding FIG. 1 can be implemented as instructions stored on a computer-readable storage medium, as hardware modules, as special-purpose hardware (e.g., application specific hardware, application specific integrated circuits (ASICs), as embedded controllers, hardwired circuitry, etc.), or as some combination or combinations of these. In examples, the engine(s) and/or modules described herein can be a combination of hardware and programming. The programming can be processor executable instructions stored on a tangible memory, and the hardware can include a processor for executing those instructions. Thus a system memory can store program instructions that when executed by the processor implement the engines described herein. Other engines can also be utilized to include other features and functionality described in other examples herein.

The system 100 can include a task initialization module 108, a domain-aware image selection module 110, a training instance generation module 112, and an adaptation training module 114. Alternatively or additionally, the processing system 100 can include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein.

The adaptation training performed using the system 100 enables users to collaboratively train a domain-aware adaptation model for a target visual domain. It is divided into the following steps: adaptation task initialization via the task initialization module 108; domain-aware image selection via the domain-aware image selection module 110; training instance generation via the training instance generation 112, and model training 114.

Generally, the adaptation training includes adaptation task initialization 108, domain-aware image selection 110, training instance generation 112, and model construction (i.e., model training module 114). The initiator 120 sends an adaptation task to the master 122. The adaptation task characterizes the target visual domain by a set of context attributes (i.e., specifications) such as location, time, weather, etc. The master 122 determines if new model needs to be generated. If so, it requests workers 124, which may be mobile devices, to participate in training. As part of the domain-aware image selection 110, the workers 124 select candidate images matching the task specification using a distributed clustering mechanism for image pruning (see FIG. 6).

One or more embodiments of the present invention can utilize a cloud computing environment (e.g., the cloud computing environment 50) to perform the distributed clustering. The training instance generation module 112 first detects objects within each candidate image and then crops them as training object images. Object images are input to a generic machine learning model that generates machine learning model features and recommended labels. Labels are presented to a user who selects the correct label. The model training module 114 constructs training instances from features and user selected labels that are used to train an adapted model (i.e., an adaptation model). The adapted model and training instances are stored in an adaptation database (not shown).

The model adaptation training should incur minimal human effort, respect user privacy, be resource efficient, and be done in real-time. This example achieves the above goals via the main system components, described herein.

The phrase "machine learning" broadly describes a function of electronic systems that learn from data. A machine learning system, engine, or module can include a machine learning algorithm that can be trained, such as in an external cloud environment (e.g., the cloud computing environment 50), to learn functional relationships between inputs and outputs that are currently unknown. In one or more embodiments, machine learning functionality can be implemented using an artificial neural network (ANN) having the capability to be trained to perform a currently unknown function. In machine learning and cognitive science, ANNs are a family of statistical learning models inspired by the biological neural networks of animals, and in particular the brain. ANNs can be used to estimate or approximate systems and functions that depend on a large number of inputs.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was read.

With continued reference to FIG. 1, the task initialization module 108 is initialized by a user interested in recognizing objects in a particular visual domain, or by a user who wishes to launch a training campaign for a public space, etc. For example, adaptation task initialization (via the task initialization module 108) is initialized by a user (i.e., the initiator) interested in recognizing objects in a particular visual domain (e.g., creating an adapted model for a personal space with the help of friends) or by a user who wishes to launch a training campaign for a public space (e.g., creating an adapted model for a museum with help of visitors). The initiator 120 first creates a specification of the adaptation task and then it sends it to the master 122.

In one or more embodiments of the present invention, the domain-aware image selection module 110 can be run collaboratively among participating devices (e.g., the workers 124). In such cases, it includes a function that identifies on-device images that match a target visual domain specification, and a distributed clustering mechanism that enables participating devices to collaboratively select a representative subset of images, which may be subject to a per-device limit as to the number of selected images.

The training instance generation module 112 runs on each participating device. It can include an object proposal algorithm targeted for fast and accurate extraction of object images from each selected image, and a generic machine learning model. The generic machine model takes the proposed objects and automatically generates labeling recommendations to the user of the device. The user selects a label for the object. The image features are simultaneously extracted from a hidden layer of the generic machine learning model. The label and image features form a training instance for the target visual domain.

The adaptation training module 114 trains a model (e.g., support vector machine (SVM)) using the resulting training instances from participating collaborative users. The adaptation training module 114 is of low computational complexity and can run on a mobile device, a local device, a remote device, or another suitable device such as the processing system 900 of FIG. 9.

The adaptation training works by issuing adaptation training tasks to participating devices (e.g., the workers 124). Each adaptation task targets a particular visual domain. The adaptation training utilizes an initiator 120, a master 122, and the workers 124.

The initiator 120 initializes an adaptation task by specifying the characteristics of the target visual domain and sending such specifications to the master 122. The initiator 120 can execute on a mobile device, a local device, a remote device, or another suitable device such as the processing system 900 of FIG. 9.

The master 122 accepts an adaptation task request and coordinates collaboration among the workers 124 for this task. The master 122 can execute on a mobile device, a server, or another suitable device such as the processing system 900 of FIG. 9.

Workers 124 receive and execute adaptation tasks. The task takes as input images from the target visual domain and generates training instances. These training instances are used to train adapted models to the target visual domain. Subsequently, each user can use this adapted model for object recognition in the target visual domain. The workers 124 are executed on devices of users, for example, or other suitable devices.

The workers 124 can include generic deep machine learning model 126 (e.g., the 1000-class AlexNet CNN model, which can be used on mobile devices, a local device, a remote device, or another suitable device). The model 126 generates features and label recommendations for image objects.

An adaptation database (not shown) contains training instances and adapted models that are generated by adaptation tasks. Each training instance and adaptation model correspond to a target visual domain. The adaptation database can be stored at a local or remote server or on another suitable device, such as the processing 900 of FIG. 9. It can also be distributed among multiple mobile devices since the generation of training instances and adaptation models can be performed on the mobile devices.

The adaptation task specification characterizes the target visual domain by a set of context attributes such as location, time, weather, etc. These visual domain attributes aid workers in selecting matching images they have on their devices. The attributes can be defined at different levels of granularity. For example, the location can be defined at the granularity of places (e.g., restaurants, classrooms, bedrooms, etc.), or GPS coordinates, etc. Adaptation tasks can be initialized either remotely or locally. Any authorized initiators with no location or time constraint can initiate remote tasks. Local tasks are initialized by an onsite/local user who would like to train and use an adaptation model for the visual domain she is currently located.

Figure 2:
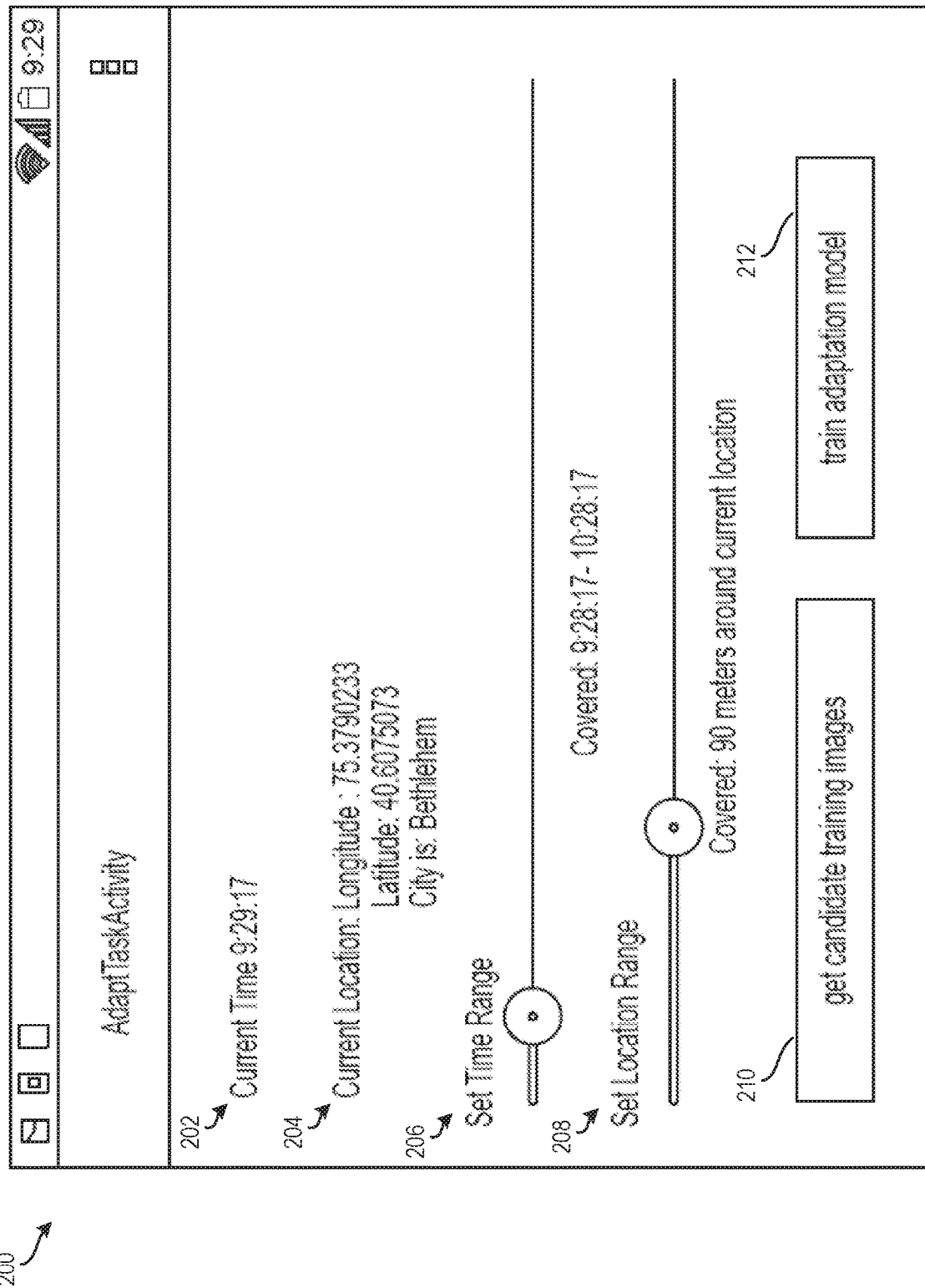
FIG. 2 depicts a screenshot of a local adaptation task specification according to one or more embodiments of the present invention.

FIG. 2 depicts a screenshot 200 of a local adaptation task specification according to one or more embodiments of the present invention. The task specification includes information such as current time 202, current location 204, time range (which can be set (e.g., using a slider)) 206, location range (which can be set (e.g., using a slider)) 208, and options to get candidate training images 210 and/or to train an adaptation model 212.

The visual domain attributes can be set by calling system APIs on the initiator device (e.g., time and location). On receiving the task specifications, the master 122 first checks with the adaptation database if there is an existing adaptation model that matches the specified target visual domain. The model matching criteria can be flexibly determined (e.g., if the model is defined with location attribute as a region (e.g., GPS coordinate+radius)), the master 122 can calculate and present the region overlapping ratio with existing adaptation models (if defined with location regions), and based on this information the task initiator 120 can make a decision on whether or not a new model should be trained.

If a pre-trained model exists, the initiator 120 can select to use it directly or to enhance the existing model using more training instances. If this is a new adaptation task or the initiator 120 decides to enhance an existing model, the master 122 broadcasts the adaptation task to participating devices (e.g., the workers 124) with running worker software.

The adaptation task description contains directions to the prospective workers 124. One or more embodiments of the present invention support at least two scenarios of adaptation tasks. In a first scenario, a task can ask users to use existing images stored in their devices. In a second scenario, it can ask the user to take (i.e., capture) and label images of the target domain within a finite time interval. If a user is willing to participate, the user sends an acknowledgment back to the master (e.g., the master 122) and her device becomes a worker (e.g., one of the workers 124).

The initiator (e.g., the initiator 120) can also specify an expiration time for the adaptation task. When the task expires, the master stops recruiting new workers and will train an adaptation model using training instances created by existing workers.

Once the worker devices have been identified, they start executing the adaptation task as a collaborative group. This collaboration can be executed in a peer-to-peer fashion or can be coordinated by the master 122.

Domain-aware image selection (via the domain-aware image selection module 110) enables each worker (e.g., the workers 124) to scan its local storage to get a list of candidate images matching the task specification received from the initiator 120. The list of these candidate images can be very large and each image can contain multiple objects. Manually labeling a large number of objects is exhaustive and impractical. For example, if an image contains three objects on average, and a user takes five seconds to label one object, labeling 100 images will incur twenty-five minutes of the user's time.

In order to address the above problem, one or more embodiments of the present invention utilize an image pruning mechanism. First, the worker 124 asks the user to specify the maximum number of images the user would like to label or the maximum time that the user would be willing to spend labeling images (which is translated to a maximum number of images given a time estimate for labeling each image).

Assuming the maximum number of images for each user i is $n_i$, embodiments of the present invention can use a clustering algorithm (e.g., k-means) to create $n_i$ clusters each containing similar images and select the nearest neighbors to the cluster centroids as representative images for the user to label. Clustering can be performed based on various types of features extracted from the images. For example, Color and Edge Directivity Descriptor (CEDD) can be used. A more computationally intensive alternative is to pass the images through the generic machine learning model and use the features output from the earlier ("more general") stages. A potentially more accurate, yet computationally intensive, alternative is to use machine learning model features or candidate labels of the objects in each image. These can be obtained by passing the images through an object detection algorithm and the resulting objects are passed to the generic machine learning model.

Running the above image pruning mechanism individually on each user's device is not optimal in terms of user effort because different workers 124 can have taken similar images and, without knowing what images are selected by other workers, duplicated objects can be included in the selected images of different workers. This can result in significantly extra effort for each user. One way to address this problem is to use an extended version of the image pruning mechanism, where a distributed mechanism that provides for clustering coordinated by exchanging features of images or cluster centroids among different users. This approach can distribute the labeling effort to multiple users thereby minimize the labeling effort of each user.

On each participating device, the worker 124 passes the selected images through the training instance generation module 112. For an image containing multiple objects, the pipeline first automatically detects objects within the image, and crops them out as training object images (i.e., an object image contains exactly one single object to be labeled). This automation can be achieved using state-of-the-art object detection algorithms such as EdgeBoxes. For objects missed by the automated object detection algorithm, the system can also ask a user to identify objects she would like to label by indicating the location of the object on the image shown on her phone screen. Upon such selection (e.g. by drawing around the object), a cropped object image is created.

Once the cropped object images are created (either automatically or manually), they are input into the pre-installed generic machine learning model which produces two outputs described below: (1) machine learning model features and (2) candidate labels.

Machine learning model features are extracted from one of the hidden layers of the generic machine learning model. For image classification tasks, the best performing machine learning models are Convolutional Neural Networks (CNNs) and their features are called ConvNet features. The extracted ConvNet feature has been proved to be quite discriminative and has shown excellent performance in many different types of applications such as image retrieval and scene recognition.

A list of candidate labels for each object image can also be output. Although the recognition accuracy (Top-1) of a generic machine learning model may not be sufficiently acceptable for a given target visual domain, it is likely that the correct prediction is included in the Top-K results (around 90% for Top-5). Furthermore, since each user is asked to label objects in her own images, there is a better chance for her to know what the objects are in her own images than labeling any object from other users' images.

The list of candidate correct labels is presented to the user. The presentation can be in various forms such as multiple choice buttons, menus, etc. A worker user selects the correct label by interacting with the device interface. For an object image that does not have its correct label presented in the suggested labels, there are three options. First, a user can manually input the correct label but use autocomplete suggestion. Second, if a user does not recognize the object, she can label it as a special class "other." Third, a user is also given the option to skip labeling of this object image. Each <user-selected label, machine learning model feature> pair forms a new training instance associated with the target visual domain. Training instances are then inputted to the training adaptation pipeline to create an adapted model.

Model construction occurs in the training adaptation module 114. When participating workers 124 finish generating training instances or when the adaptation task expires, adaptation can be performed by using the training instances to create a new model using traditional training methods (e.g., Softmax or SVM). The adaptation training can be done either at the master 122 or collaboratively among the workers 124 using a distributed learning method.

The adapted model can be shared with participating users. This adapted model, as well as the training instances, are stored in the adaptation database (not shown) along with the corresponding specification of that visual domain and can be shared with other users with the same adaptation requirement. New users can use the model directly or can incrementally train it with new training instances.

Figure 3:
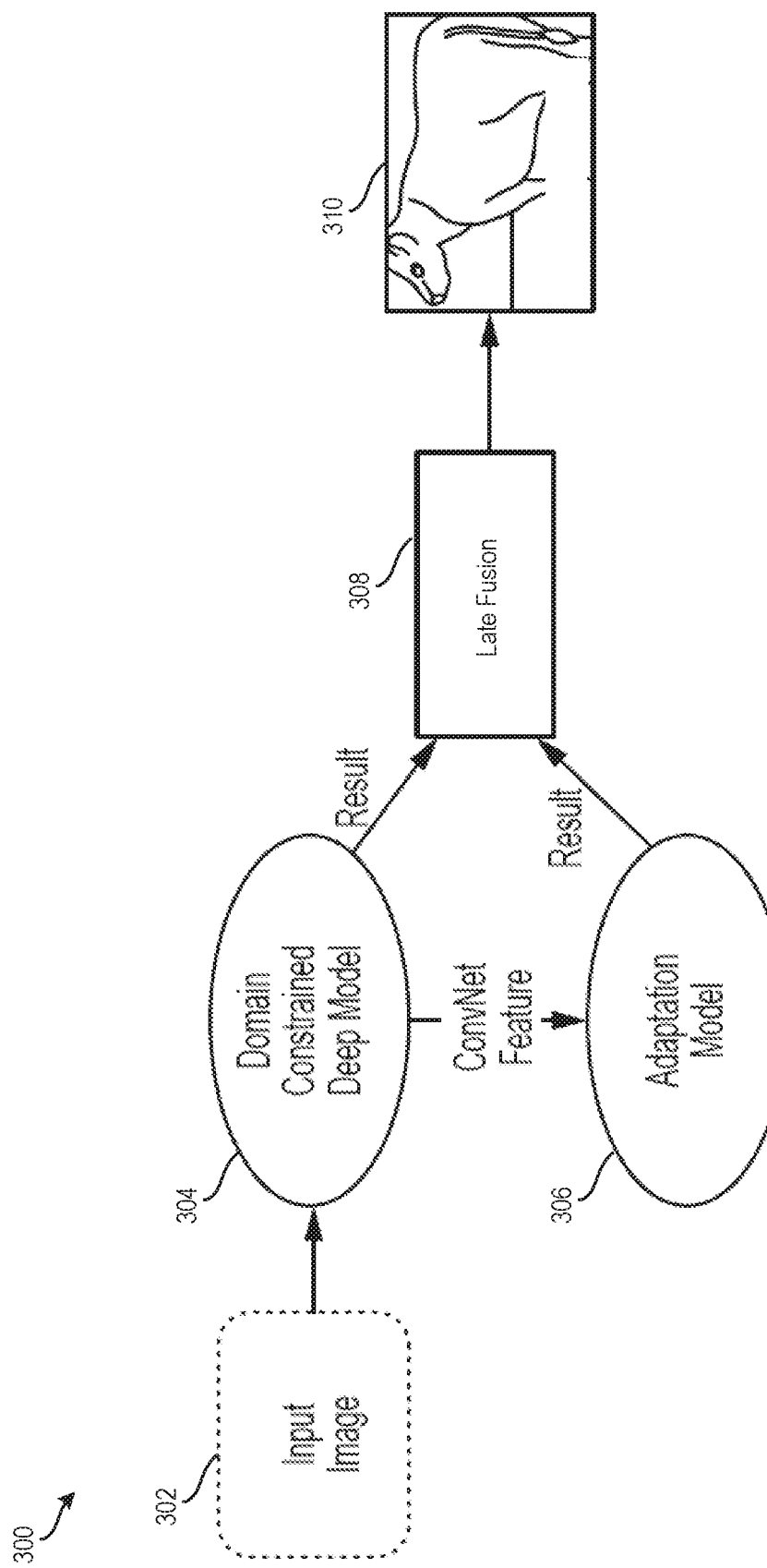
FIG. 3 depicts a flow diagram of a method for object recognition using late fusion according to one or more embodiments of the present invention.

FIG. 3 depicts a flow diagram of a method 300 for object recognition using late fusion according to one or more embodiments of the present invention. First, an input image (block 302) is inserted into a domain-constrained machine learning (deep) model (block 304), which is created from a generic deep model. The domain-constrained machine learning (deep) model is restricted to recognize only the classes of the target visual domain (e.g., the adaptation model) (block 306). Late fusion then occurs (block 308) to obtain predictions (block 310) by combining the predictions of the domain-constrained machine learning model and the adapted model.

In particular, the method 300 performs object recognition on the target visual domain using a late fusion technique (block 308) that combines the recognition results of the domain constrained machine learning model (e.g., the domain constrained deep model at block 304) and the adapted domain-specific model (e.g., adaptation model at block 306). Different from existing works on late fusion, the late fusion technique described herein does not require training a separate domain-specific machine learning model. Instead, it provides the domain information (i.e., the set of existing classes/labels in the adapted model) to the generic machine learning model so that it ignores domain-unrelated classes in its prediction.

The embodiments of the present invention enable object recognition on images acquired in the target visual domain using both the adapted model and a domain-constrained machine learning model as illustrated in FIG. 3. Specifically, the embodiments of the present invention use late fusion to generate the final recognition result by considering the following benefits: good performance with few training instances; simple adaptation training; and sharing adaptation as a plug-in.

Simple adaptation training provides for training a learning model that is fast and can be performed even on a single mobile device. This is in contrast to training a new machine learning model which utilizes a powerful processing system, such as a GPU-equipped server.

Sharing adaptation as a plug-in provides for easily sharing a model with other users who are interested in object recognition in such target visual domain. This is possible because a model has a smaller size than a generic machine learning model and can therefore be more easily shared.

One issue in applying late fusion directly for adaptation of visual domains is that traditional late fusion assumes that both the machine learning model and the model recognize the same set of object classes. However, the set of object classes available in each target visual domain is highly variable, and it is impractical to train or fine-tune a machine learning model for each domain. The domain-constrained machine learning model described herein solves this problem.

The domain-constrained machine learning model, created from the generic machine learning model, recognizes only the object classes included in a target visual domain. The domain-constrained machine learning model is constructed as follows. In one example, there are object classes from a set D in the target visual domain (i.e., classes in the adaptation model). For each input object image, the generic machine learning model outputs a prediction vector represented by the probabilities $\{p_1, p_2, p_S\}$ of that object image belonging to S different recognizable classes by the generic model (where S is a superset of D). Given $\{p_1, p_2, \ldots, p_S\}$, the domain-constrained prediction output vector $\{P_1, P_2, \ldots, P_D\}$ is obtained by retaining the probabilities of the object classes in subset D and normalizing them using the following equation:

$$P_{dc\text{-}deep}(i) = \frac{p_i}{\sum_{n \in D} p_n}, \forall i \in D$$

To obtain the final recognition result, late fusion is applied. Late fusion is a prediction technique wherein a final prediction for an input is made based on some combination of the predictions of one or more models, without combining the models themselves. The object image is input to both the domain-constrained machine learning model and the adapted model. Then a linear interpolation between the output prediction vectors of the adapted model and the domain-constrained machine learning model is used to compute a fused prediction as probability of a particular object to belong to the object classes of the target visual domain using the following equation:

$$P_{fused}(i) = aP_{dc\text{-}deep}(i) + (1-a)P_{shallow}(i), \forall i \in D$$

The parameter α for late fusion can be determined through experimentation on training sets from similar visual domains. Alternatively, it can be feasible to monitor the inference error rate of the generic machine learning model in the interactive labeling process and adapt a accordingly. For example, if the generic model gives bad suggestions for labeling of the adaptation training images (e.g., correct labels are ranked low), a small value can be set, and vice-versa.

Figure 4:
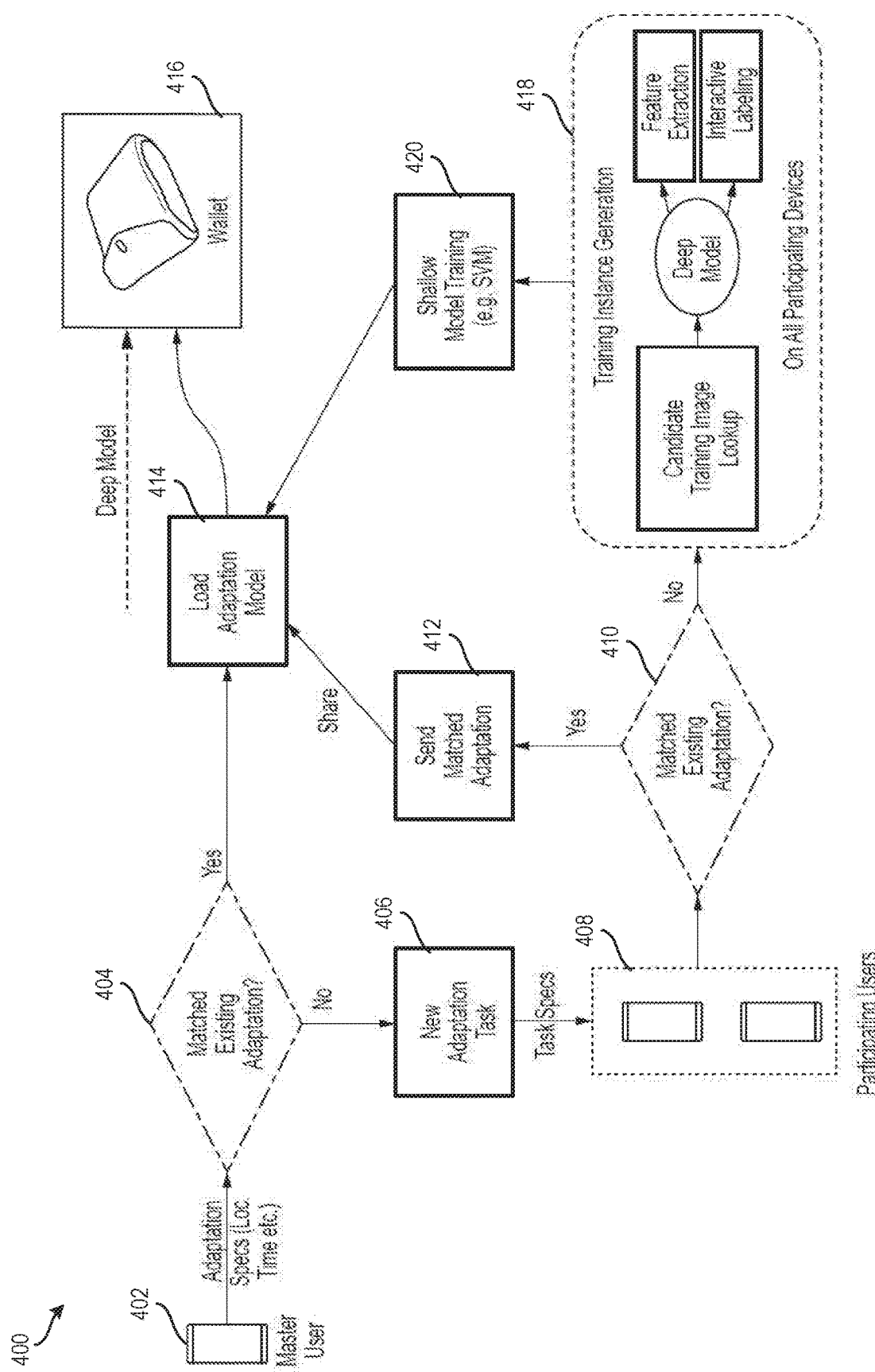
FIG. 4 depicts a flow diagram of a method for combined adaptation training and recognition according to one or more embodiments of the present invention.

FIG. 4 depicts a flow diagram of a method 400 for combined adaptation training and recognition according to one or more embodiments of the present invention. In this embodiment, the initiator 120 and master 122 are on a single initiating device 402. In addition, the adaptation database is distributed among the participating users. The initiating device 402 wishes to perform object recognition on a new visual domain.

At block 404, it is determined whether a matched existing adaptation model exists. If yes, the adaptation model is loaded at block 414. Then this model is used for object recognition in conjunction with the pre-installed generic machine learning model to identify the object at block 416.

However, if at block 404 it is determined that no adaptation model is loaded, a new adaptation task is created at block 406, and task specifications are sent to participating user devices at block 408. It is then determined whether a matched existing adaptation model exists at block 410. If so, the matched adaptation model is shared at block 412 and the adapted model is sent back to the initiator who loads it into memory. However, if no matched existing adaptation model exists at block 410, training instance generation at block 418 (e.g., training instance generation module 112 of FIG. 1) occurs by performing candidate training image lookup and applying a deep model to extract features on perform interactive labeling on participating devices. The training adaption then occurs by performing model training at block 420.

Additional processes also can be included, and it should be understood that the processes depicted herein represent illustrations and that other processes can be added or existing processes can be removed, modified, or rearranged without departing from the scope and spirit of one or more embodiments of the present invention.

FIG. 5 depicts an example of pseudo code 500 for an enhanced bounding boxes strategy for object detection according to one or more embodiments of the present invention. Several computer vision applications such as augmented reality and photo tagging, etc. utilize resource-intensive computer vision operations that include object detection. Several systems offload object detection computations to servers. Other approaches perform restrictive object recognition on mobile devices (e.g. only single-object images).

One or more embodiments of the present invention are directed to exploratory object detection on complex multi-object images taken by cameras of mobile devices such as smartphones, tablets, or wearable processing devices. Example intended applications could be automated mobile photo tagging, mobile augmented reality, or semi-automated generation of training instances for machine learning algorithms.

The object detection approach can be exploratory in nature (i.e. there is no a priori knowledge as to the nature or shape of the objects to be detected). For example, in an augmented reality photo tagging application a user can be in a new environment and need to tag objects that are identified on the camera view of her smartphone. For energy, privacy, and network bandwidth reasons, it can also be possible for the system to run object detection on the mobile phone instead of offloading to servers.

The object detection provides for determining whether an object exists in an image, and if so where in the image it occurs. The object detection problem is difficult to solve in real time especially using constrained resources of mobile devices. Traditionally, the object detection problem over the past decades has been addressed with the sliding windows approach in which object classification is performed at every location and scale in an image. Such approaches also require existing knowledge of the object to be detected and are compute-intensive.

Instead of searching for an object at every image location and scale, a set of object bounding box proposals is first generated with the goal of reducing the set of positions that need to be further analyzed. With this method, object proposals can be accurately generated in a manner that is agnostic to the type of object being detected. Several object detection algorithms currently use object proposal generators.

Therefore object proposal methods are suitable for exploratory object detection and are less compute intensive than sliding window methods. However, approaches based on object proposal methods are still not applicable to mobile environments and applications. Existing object proposal methods yield hundreds of object proposals per image, which is not practical for human mobile phone users.

Typically a human user will either pay attention to a few objects of interest that appear in the limited space of their mobile phone camera screen or in a photo tagging application will be willing to tag only a few objects.

In addition, when object proposal is used for tagging or for generating training instances for machine learning algorithms, it has different challenges and requirements from the traditional bounding box proposal algorithms used for known object detection tasks, including the following. For example, it is hard to know the set of available objects in advance. Good training images for the adaptation task should have margins around the target objects to capture the target visual domain information. Users can be asked to select the correct label for each object/box and hence should identify fewer bounding boxes to minimize users' labeling efforts. Overly small boxes should be ignored because too small boxes are unsuitable for adaptation training due to low image quality.

Accordingly, embodiments of the present invention are provided herein to address the object detection problem for mobile phones using an object proposal algorithm that utilizes mobile context. This is achieved by constraining the number of object proposals analyzed by the object detection system based on mobile contextual information specific to mobile (i.e., user location, user preferences or other mobile application characteristics).

The embodiments of the present invention partition the geographical area where contextual object detection is to be applied in multiple contextual domains and constrain the number of object proposals on each domain based on contextual information. The constraint is defined by the user preferences (e.g., the user wishes to label up to k objects), by historical contextual knowledge (e.g., in the past a certain objects interest have been detected by other users in that area).

In the first step, the geographical area is partitioned into different visual domains, each domain characterized by a maximum number k of object proposals suitable for the domain. Each time the object detection is run, a baseline object proposal algorithm such as EdgeBoxes is run on the mobile device. To identify each individual object from complex images with multiple objects, an object proposal algorithm, such as Edge Boxes, is used to propose bounding boxes for potential objects. Traditionally, the object proposal method is used as an essential step for object detection that requires both high recall and high accuracy. Those requirements mean that the algorithm will locate as many as possible bounding boxes, which inevitably propose too many noisy proposals.

However, for a mobile tagging system, it may not be necessary to achieve perfect recall and accuracy since the same object is quite likely to be captured in other images or from other users, and of course, users would like to deal with as few images as possible, therefore tagging effort would be minimized. Therefore, the embodiments of the present invention run the object proposal technique as follows: (1) Based on user satisfaction, only top k proposed bounding boxes (with the highest confidence) are reserved, and typically k is very small (e.g., k<=5). This contrasts classical object proposal methods, where hundreds of bounding boxes are proposed. (2) Among the k bounding boxes, the bounding boxes with large overlap to other bounding boxes are removed. The remaining bounding boxes are cropped out from the original image as the unlabeled training images.

More specifically the embodiments of the present invention provide for removal of large and small boxes, equal regional distribution, and adding margins to bounding boxes.

Large bounding boxes proposed by the baseline object proposal algorithm will normally cover more than one object in a multi-object image. On the other hand, if an object covers a large area of the photo, it is typically in a one-object image, which does not require the bounding box identification process. Lastly, small bounding boxes typically contain unclear images that are not usable.

If the area of a proposed bounding box is larger than a certain percentage (e.g., 40%, 20%, 45%, etc.) of the image area, then it can be considered to be "too large". If the area is smaller than a certain percentage (e.g. 1%, 5%, 20%, etc.) of the image area, it can be considered it to be "too small". The embodiments of the present invention discard all "large" and "small" boxes.

Equal regional distribution enforces equal regional distribution of bounding boxes in a given image. First, a given image is divided into four equal regions: Upper Left, Lower Left, Upper Right, Lower Right. Next, if the bounding box being considered, (i.e., $b_i$), can be assigned to one of the four regions using the function equal region illustrated in FIG. 2 is determined. This function ensures that (i) only a maximum of j bounding boxes are retained among all regions, (ii) the maximum number of boxes assigned to a region is ceil(j/4).

For a bounding box with width w and height h, a larger box with width 1.5*w and height 1.5*h is generated while keeping the original box center.

When images are scaled to different resolutions, the baseline object proposal algorithm (e.g., EdgeBoxes) detects objects at different detail levels, and thus produces different sets of bounding boxes. The union of each set of proposed bounding boxes produced using different image resolutions covers more complete objects. Unfortunately simply returning the union of boxes at different scale can be overkill and can compromise the design goal of limiting the number of boxes for a user to tag. Therefore, a box merging method is provided to remove redundant boxes from the union set. The redundant boxes are boxes with "nearly-the-same" visual content. Two boxes can be considered as having "nearly-the-same" visual content if their intersection area exceeds 50% of the area of each individual box. For such boxes, we merge by generating a union of these two boxes.

Figure 7:
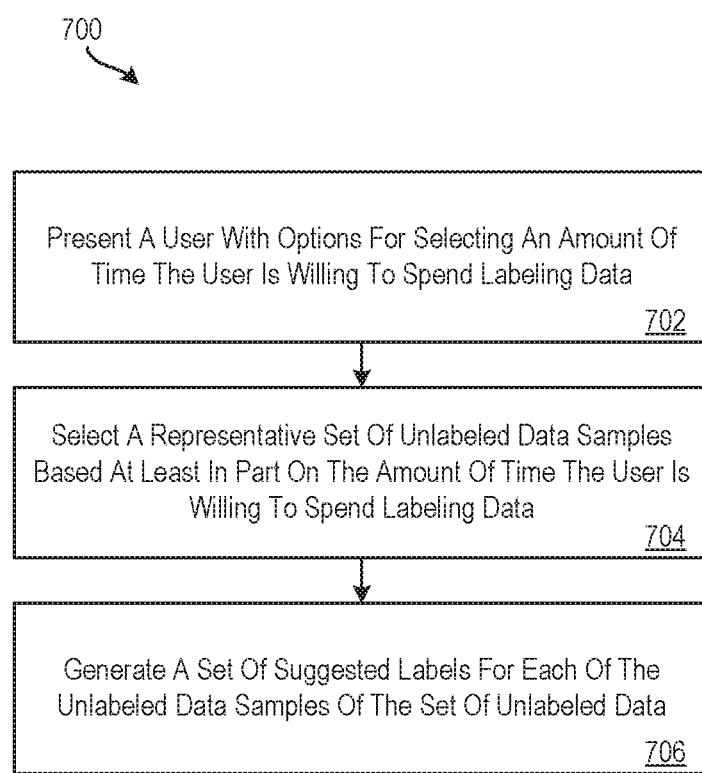
FIG. 7 depicts a flow diagram of a method for interactive generation of labeled data and training instances according to one or more embodiments of the present invention.

One or more embodiments of the present invention are directed to the interactive generation of labeled data and training instances. For example, FIG. 7 depicts a method 700 for interactive generation of labeled data and training instances according to one or more embodiments of the present invention.

At block 702, a user is presented with options for selecting an amount of time the user is willing to spend labeling data that is unlabeled. In some examples, the unlabeled data can be sensor data, audio, video, or image data, or any other kind of data. The representative set of unlabeled samples can be chosen based on clustering, principal component analysis, or any other statistical or analytical technique. The unlabeled data samples can reside across a plurality of devices and may not be exported or shared in raw. The unlabeled data samples can represent groups of samples instead of individual samples, e.g., an image containing multiple objects can represent a sample. At block 704, a representative set of unlabeled data samples is selected based at least in part on the amount of time the user is willing to spend labeling data.

At block 706, a set of suggested labels is generated for each of the unlabeled data samples of the set of unlabeled data. Once the set of suggested labels for each of the samples is generated and presented to the user, the user selects one label for each sample. The selected label is verified for truthfulness, and the selected label, along with features automatically extracted from the sample, are stored as a training instance. The data is stored along with its label and other information such as visual domain, unique identifier, features, etc.

The suggested labels can be generated by application of a machine learning model, by looking up labels applied to similar samples in the past, or by any other means. A user can manually input the correct label but use autocomplete suggestion. If a user does not recognize the object, she can label it as a special class "other." A user can be given the option to skip labeling the data. Verification can be performed by 1) computing a similarity score of the data with data previously labeled with the same label and/or 2) using an identifier for the labeled data and comparing the current label with labels given by other users for this labeled data using majority vote. The features of the sample can be extracted by application of a feature extraction algorithm, another statistical technique, or any other approach.

Additional processes also can be included, and it should be understood that the processes depicted herein represent illustrations and that other processes can be added or existing processes can be removed, modified, or rearranged without departing from the scope and spirit of one or more embodiments of the present invention.

In particular, embodiments of the present invention described with respect to FIG. 7 address the problem of creating labeled instances of objects in photos taken by mobile phones of human users. Such labels can be used as training instances for supervised learning classification tasks, for computer vision-based augmented reality applications or for creating inventories of physical objects in the location where the mobile images have been taken.

In supervised machine learning, the quality of labels assigned to training instances is very important, especially when the number of training instances is limited. In addition, image labeling is an error-prone process for various reasons, such as errors by the labeler, the imperfect description of classes, and the like. Also when multiple users are involved in labeling, there is also a label consensus problem for labeling the same object class.

Traditionally, labeling is mostly performed manually. Manual data labeling is labor-intensive and prone to the human errors. The training data it produces often lacks in both quantity and quality. Fully automatic data labeling, on the other hand, is not feasible and reliable.

Existing automatic labeling technique, though effective in some application scenarios, are still error prone especially on data generated in the wild (e.g., day life photos). To facilitate the labeling process, interactive labeling techniques, which combine the power of automatic image labeling and human feedback, have been investigated by the machine learning community. Interactive labeling has been proposed to combine the power of automatic image labeling and human feedback. Existing methods do not address the above problems effectively and are not applicable to mobile systems environments.

The embodiments of the present invention provide an interactive labeling technique for rapid creation of labeled data based on images taken by mobile phones (either stored photos or pointing the camera to a physical scene as in augmented reality applications). According to the embodiments of the present invention, labeling is performed with minimal human effort where a machine learning model provides a set of candidate recommendations presented as multiple choice to the user. The use of machine learning model helps in multiple ways. First, users can rapidly label objects in photos by selecting one of the recommendations. Second, the user labels are provided by the machine learning model classes; therefore, label inconsistencies of the same object from different users are not arbitrary but constrained within the machine learning model classes. Third, machine learning models do not require a separate large database of images as in classic object detection schemes. This enables running the machine learning model-based labeling procedure on a mobile device as opposed to sending the photos to a remote server machine.

The resulting labeled image data can be used as training instances for other supervised learning classification tasks, for augmented reality applications or for creating inventories of physical objects in the location where the images have been taken. The embodiments of the present invention have the following advantages over existing approaches. In particular, embodiments of the present invention: are applicable to mobile system environments and use mobile user input; minimize human labeling effort using machine learning model recommendations; address the incorrect labels and consensus problem using a constrained set of classes from the machine learning model and unique labeled object identifiers; and avoid the usage of a separate large object database at a remote server. Instead, all computations can occur using a generic machine learning model on the device.

According to examples of the interactive generation of labeled image data of one or more embodiments of the present invention, a generic machine learning model is used to guide the human user in labeling images in an effortless manner. The goal is to minimize human labeling effort while increasing labeling accuracy.

On each participating mobile device, the system passes selected images through the label generation pipeline. For an image containing multiple objects, the pipeline first automatically detects objects within the image, and crops them out as object images, i.e., an image contains exactly one single object to be labeled. This automation can be achieved using an object proposal algorithm (e.g., EdgeBoxes) that is adapted to mobile environments and aims to select a few object bounding boxes with high recall. Each selected photo is passed through an object detection module, which identifies objects of interest in the image. Creating cropped images from the original image can generate these objects.

Then these object images are input to a machine learning model module that returns a set of label recommendations to the user screen regarding each object in the image. Since the machine learning model has been pre-trained with many images, no separate object database is needed for matching the detected objects. The machine learning model also allows for exploratory labeling of images because no a priori knowledge is needed about the nature of the objects being detected.

This design is based on the observation that, although the recognition accuracy (Top-1) of a generic machine learning model is not sufficiently good (<60% for a dataset), it is quite likely that the correct prediction is included in the Top-K results (around 90% for Top-5). Furthermore, in case a user is asked to label objects in her own images, there is a better chance for her to know what the objects are in her own images than labeling any object from others' images. A user selects the correct label by tapping on the screen.

For an object image which does not have its correct label presented in the suggested labels, there are multiple options: 1) a user can manually input the correct label, such as using autocomplete suggestion (this can require the database to contain the class for that object); 2) if a user does not recognize the object, she can label it as a special class "other;" and 3) a user is also given the option to skip labeling of this image.

For verification purposes, it is possible to compute an identifier of the labeled object once a user creates it. This identifier is independent of the user label and can be a function of the object image content (e.g., a feature generated from the object image) and/or the mobile context (e.g., location) where the object was detected.

Next, each object along with its label is passed to a verification module that checks that the proposed label is truthful. The verification module contains a database of previously labeled object images (either by other users or a pre-existing database). The module computes a similarity score of the current image with other images under the same label. If the similarity score is high the cropped image is marked truthful otherwise it is not. A second way to provide verification is to use the identifier of the labeled object. When another user labels the same object, the system identifies the object based on the identifier and a majority vote is computed based on the labels previously provided for the same object. If the proposed label is marked truthful it gets the proposed label. Otherwise, the system discards the label.

In the last step, the object is stored along with additional information the system database of labeled objects for later use. Each user-selected label, the object image, its unique identifier, its mobile context (e.g., a location) and potentially ConvNetfeatures of the machine learning model forms a new labeled object entry stored in an object database.

Figure 8:
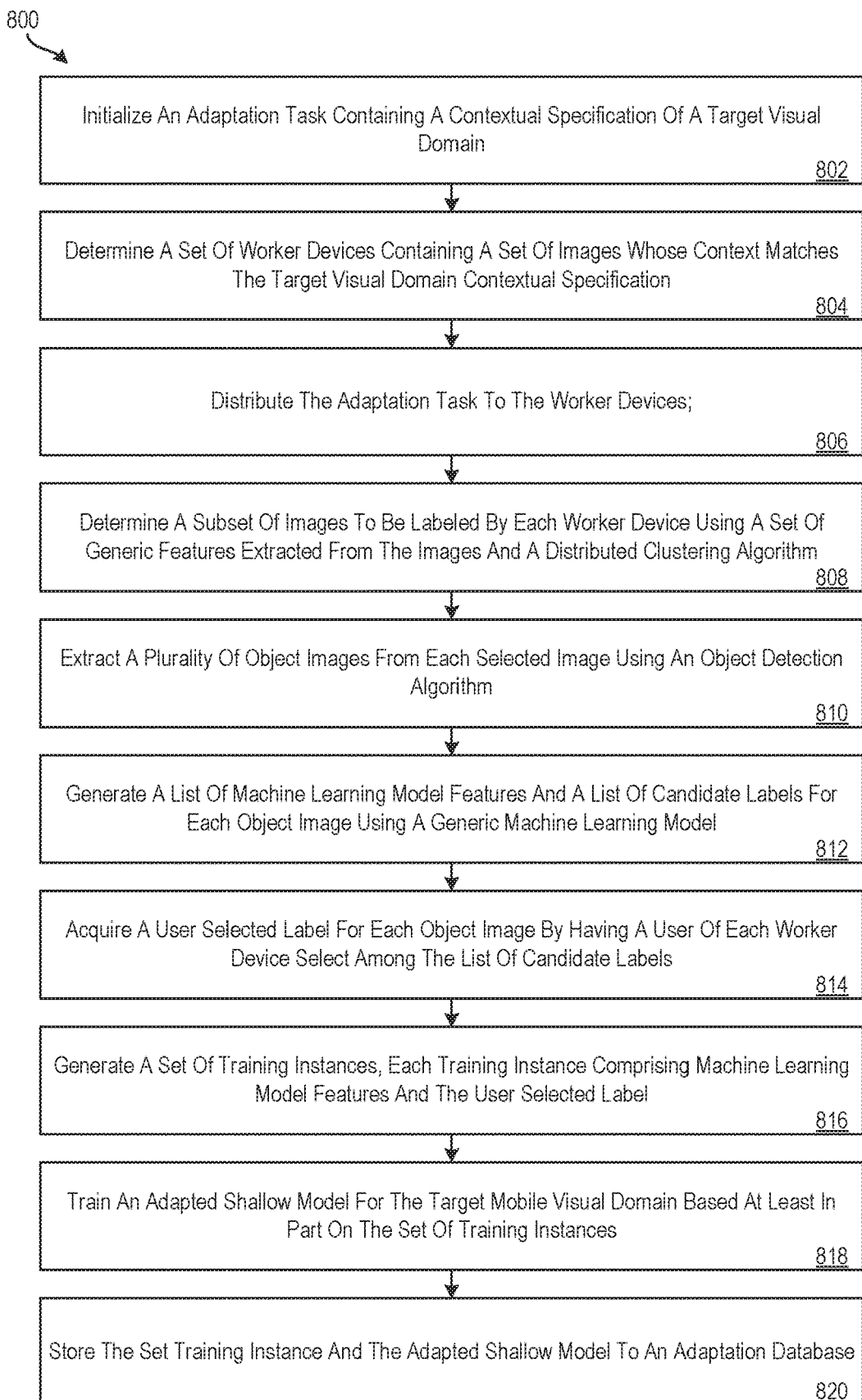
FIG. 8 depicts a flow diagram of a method for identifying representative samples from datasets across multiple devices according to one or more embodiments of the present invention.

According to one or more embodiments of the present invention, techniques for data clustering in heterogeneous distributed mobile cloud environments (e.g., the cloud computing environment 50) are provided. For example, FIG. 8 depicts a method 800 for distributed data clustering according to embodiments of the present invention. In particular, the method 800 provides for identifying representative samples from datasets across multiple devices.

At block 802, an initiator 120 initializes an adaptation task containing a contextual specification of a target visual domain. At block 804, a master 122 determines a set of worker devices containing a set of images whose context matches the target visual domain contextual specification. At block 806, the master 122 distributes the adaptation task to the worker devices (e.g., workers 124). At block 808, the worker devices determine a subset of images to be labeled by each worker device using a set of generic features extracted from the images and a distributed clustering algorithm. At block 810, the worker devices extract a plurality of object images from each selected image using an object detection algorithm.

At block 812, the worker devices generate a list of machine learning model features and a list of candidate labels for each object image using a generic machine learning model. At block 814, the worker devices acquire a label for each object image by having a user of each worker device select among the list of candidate labels. At block 816, the worker devices generate a set of training instances. Each training instance includes machine learning model features and the human-selected label. At block 818, the worker devices train an adapted model for the target mobile visual domain based at least in part on the set of training instances. At block 820, the worker devices store the training instance and the adapted model to an adaptation database.

Additional processes also can be included, and it should be understood that the processes depicted herein represent illustrations and that other processes can be added or existing processes can be removed, modified, or rearranged without departing from the scope and spirit of one or more embodiments of the present invention.

The embodiments of the present invention as described with respect to FIG. 8 are related to the distributed data collection and representation. In several applications, there is a need to identify a representative collection of data among data sets distributed across heterogeneous sites. Each site can have different compute and storage capabilities which can be captured as an upper bound on the number of representative data points. If each site computes representative data points using a clustering algorithm this will satisfy the requirement of each site but does not address the overlap issue. This means that sites with high overlap will end up storing similar representative data. On the other hand, if all data is transmitted to a central site, it can be possible to address the inclusiveness issue by computing representative data based on some of the clusters and then distributing to each site a number representative data according to its requirements. However, this case is inefficient from a bandwidth, energy and privacy point of view.

There exist different application scenarios where this problem arises: 1) mobile users labeling photos in a crowd sensing campaign, and 2) distributed data deduplication. This application is typically splitting data files into multiple chunks and trying to keep one chunk in one site and pointers to that chunk on the other sites. The embodiments of the present invention address these problems by coordinating clustering operations among different sites.

In one example embodiment, consider a mobile crowd sensing application, including a master device and at least one worker device for object extraction and labeling based on images stored on mobile devices. In this crowd sensing application, the mobile users (e.g., workers 124) receive a labeling task from the master (e.g., the master 122) and act as workers with the objective to label objects on candidate images stored in their mobile phones. The list of candidate images on each phone can be very large and each image can contain multiple objects. Manually labeling a large number of objects is exhaustive and impractical for humans. For example, if an image contains 3 objects on the average, and a user takes 5 seconds to label one object (i.e., create one training instance), labeling 100 images will incur 25 minutes.

Therefore, each mobile user (e.g., workers 124) has a different limit on the number of images she wishes to label. Given this maximum limit, the method should select a subset of images that collectively contain a maximum number of distinct objects.

An additional challenge that arises is that when multiple users are involved, the selection algorithm should also avoid having workers label many duplicated objects. An additional challenge is that, due to privacy considerations, it is not possible to determine duplicate objects by exchanging raw images among workers.

With regards to distributed image pruning, one problem can be set forth as follows: there is only a single worker with identity $u_i$, who wants to label up to $n_i$ ($n_i$ belongs to $Z+$) images from the set of $m_i$ (assuming $m_i > n_i$, $m_i$ belongs to $Z+$) candidate images, and it is desired to maximize the number of distinct objects covered in the selected images. However, it is unknown what objects are included in each image, and it is also not possible to identify them manually. To find a feasible solution, the present approach is based on the premise that, if the visual appearance of two images is considerably different, the possibility that the two images contain the same object is very small. Thus, instead of directly maximizing the number of distinct objects, alternatively a subset of images with a large visual difference is identified.

The embodiments of the present invention assume that an image feature vector that captures visual difference between images has been extracted from each candidate image, and the m_i candidate image feature vectors are clustered into n_i clusters, using a clustering algorithm (e.g., K-means). Then, for each cluster, only one image that is the nearest neighbor to the cluster centroid is retained.

Another example of this problem for multiple users is as follows: For a labeling task, there are N participating workers with identities {u_1, . . . , u_N} (N belongs to Z+). Each worker u_i (1≤i≤N) wants to label a subset of at most n_i images out of the m_i candidate images in her local device, and she can join the labeling task at any time point as long as the task has not expired.

It can be desirable to maximize the number of distinct objects covered in the selected images of all workers. It is unknown what objects are included in each image. A subset of images with a large visual difference is identified. However, in this case running the clustering algorithm over extracted image features on each individual worker's device as in the single worker case described above, is not the optimal solution. The reason is that different workers can have taken similar images, and without knowing what images other workers select, duplicated objects can be included in the selected images of collaborating workers.

Two special scenarios can arise as follows. In a first scenario (referred to as a "one-after-another asynchronous scenario"), it is assumed that a new worker, u_j, can only join the adaptation task after another participating worker, u_i, has selected the subset n_i of images out of its m_i candidate images to retain. To make the new worker aware of what images are retained in other workers' devices, the system requires a worker to send the image features of the selected images to the master immediately after her image selection. Let u_1, u_2, . . . , u_N denote the sequence of workers joining the task.

The first worker, u_1, who first joined this task, clusters its m_1 candidate images to n_1 clusters (as in the simplest single-worker case described above). Let C_1 be the set of n_1 cluster centroids and R_1 be the set of n_1 image feature vectors that are nearest neighbors to each of the cluster centroids in C_1. Worker u_1 retains the images corresponding to the feature set R_1 for labeling. It then forms the set S_1 using the feature vectors R_1 of the retained images, or using the centroid set C_1 for privacy considerations. Then it sends set S_1 to the master that stores it as set M_1. The second worker u_2 first receives the set M_1 from the master (which contains n_1 retained image features or centroids of worker u_1). Then a 2-step method is executed on the device of worker u_2.

In step 1, worker u_2 clusters its m_2 candidate images to n_1+n_2 clusters. Let C'_2 be the set of n_1+n_2 cluster centroids and R'_2 be the set of n_1+n_2 image feature vectors of worker u_2 that are nearest neighbors to the cluster centroids in C'_2. In step 2, worker u_2 forms a set R_2 of n_2 image feature vectors from R'_2 as follows. First, a set D_2 is formed by finding in set R'_2 the nearest neighbor of each of the n_1 feature vectors in set M_1 received by the master. R_2 is formed by subtracting D_2 from R'_2. Also let C_2 be the subset of C'_2 whose centroids correspond to the image features in R2.

Worker u_2 then forms the set S_2 using the feature vectors R_2 of the retained images, or using the centroid set C_2 for privacy considerations. Then it sends set S_2 to the master. The master forms the set M2 as a concatenation of M_1 and S_2.

The same procedure is iteratively followed by the following new users u_3, . . . , uN. Each new user u_i (3<=i<=N) receives vector M_i from the master and uses the above procedure to create its retention set R_i of images to label and centroid set C_i. Then, it sends set S_i that is either its retention set R_i or centroid set C_i to the master. Then the master creates and stores the vector M_i for the next iteration as a concatenation of sets M_{i−1} and S_i.

Let |M_i| denote the number of elements of set M_i. To avoid incurring too much communication and computational cost, a predefined threshold x_i (x_i≤|M_i|) can be set by each worker u_i so that the master will send at most x_i image features instead of |M_i| to the next worker. The set of x_i image features can be determined by either random selection or clustering over all M_i feature vectors.

In the second scenario, it is assumed that all N workers join the adaptation task simultaneously (i.e., no single worker has selected a set of retained images before other workers. This can happen when multiple workers actively accepting new adaptation tasks). Each worker u_i (1<=i<=n) specifies the number of images she would like to label, n_i, and the master notifies each worker that there are other existing workers. The proposed synchronized solution for this scenario is as follows:

Each worker u_i forms a first retention set R'_i and cluster centroid set C'_i of n_i+t_i elements each by clustering her own m_i candidate images to n_i+t_i clusters (where 0<=t_i<=m_i−n_i), and for each cluster, retaining the nearest neighbor to the cluster centroid. Here, t_i more images for each worker are selected based on the expectation that n_i images from the n_i+t_i images in set R'_i that are unique to this worker can be found.

Each worker then forms set S_i using using the set R'_i or centroids set C'_i for privacy considerations and sends set S_i to the master. On receiving all sets S_i from all N workers, the master concatenates them in a set M_i and executes a second clustering to cluster the feature vectors of M_i in n_1+n_2+ . . . +n_N clusters. For each new cluster, if the cluster members are from two different workers, just one of them is retained. Then, the information (e.g., id, or index) of the retained images is sent by the master back to each worker. Finally the worker forms its retention set R_i as a subset of R'_i by keeping the images that correspond to the indices sent by the master.

According to embodiments of the present invention for data clustering in heterogeneous distributed mobile cloud environments (e.g., the cloud computing environment 50), the solutions of the above two special scenarios can be combined using the pseudo code 600 in illustrated in FIG. 6 which is run on each worker according to one or more embodiments of the present invention. First, each worker receives the set of existing features from the master, and it checks with the master if there are synchronized co-workers. If no co-worker exists, it falls back to the one-after-another asynchronous scenario. Otherwise if a co-worker exists, it first runs the asynchronous method to get t more clusters and relies on the master for a second round clustering as that in the all-together synchronized scenario. The updateFromMaster function receives a list of identifiers for the retained images from the master.

The following represent additional embodiments of the present invention. It should be appreciated that these embodiments are merely examples.

In one or more embodiments of the present invention, a method for machine learning model-based recognition for visual domains is provided. The method can include at least one of the following: obtaining a contextual specification of the target visual domain; identifying and loading from an adaptation database an adapted model whose context matches target visual domain; receiving images from the target mobile visual domain; detecting image objects in the images using an object detection algorithm; and/or classifying said image objects by fusing the results of the adapted model and a domain-constrained machine learning model.

In yet another embodiment of the present invention, a system for machine learning model-based adaptation training and object recognition for visual domains is provided. The system can include a memory comprising computer readable instructions and a processing device for executing the computer readable instructions for performing a method. The method can include at least one of the following: determining a contextual specification for a target visual domain; extracting context from an image on a device; matching such image context to a contextual specification of a visual domain; performing image pruning from a set of images; detecting one or more objects in an image; computing object features and label recommendations using a generic machine learning model; selecting a label among a set of label recommendations; generating a training instance based on object features and user-defined labels; training a adapted model based on generated training instances; storing adapted models and generated training instances using an adaptation database; sharing adaptation models and training instances among multiple devices; constraining a generic machine learning model to a domain-constrained machine learning model; and/or fusing the result of a domain-constrained machine learning model with the result of an adapted model.

Figure 9:
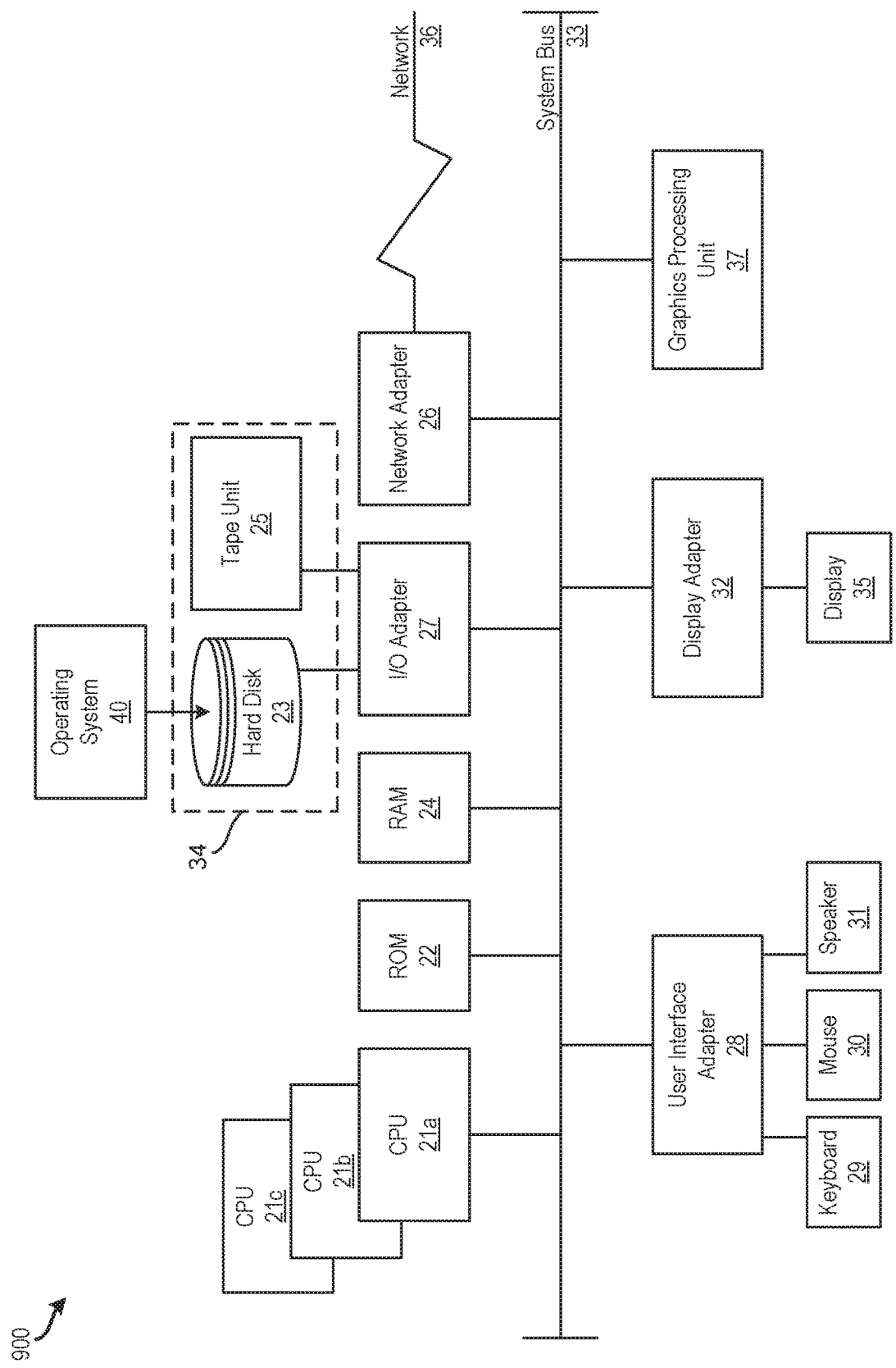
FIG. 9 depicts a block diagram of a processing system for implementing embodiments of the present invention described herein.

It is understood that one or more embodiments of the present invention are capable of being implemented in conjunction with any other type of computing environment now known or later developed. For example, FIG. 9 depicts a block diagram of a processing system for implementing the techniques described herein. In examples, processing system 900 has one or more central processing units (processors) 21a, 21b, 21c, etc. (collectively or generically referred to as processor(s) 21 and/or as processing device(s)). According to one or more embodiments of the present invention, each processor 21 can include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and can include a basic input/output system (BIOS), which controls certain basic functions of processing system 900.

Further illustrated are an input/output (I/O) adapter 27 and a communications adapter 26 coupled to system bus 33. I/O adapter 27 can be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 900 can be stored in mass storage 34. A network adapter 26 interconnects system bus 33 with an outside network 36 enabling processing system 900 to communicate with other such systems.

A display (e.g., a display monitor) 35 is connected to system bus 33 by display adaptor 32, which can include a graphics adapter to improve the performance of graphics intensive applications and a video controller. According to one or more embodiments of the present invention, adapters 26, 27, and/or 32 can be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 can be interconnected to system bus 33 via user interface adapter 28, which can include, for example, a Super I/O chip integrating multiple device adapters into a single integrated circuit.

According to one or more embodiments of the present invention, processing system 900 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing, and has a highly parallel structure that makes it more effective than general-purpose CPUs for algorithms where processing of large blocks of data is done in parallel.

Thus, as configured herein, processing system 900 includes processing capability in the form of processors 21, storage capability including system memory (e.g., RAM 24), and mass storage 34, input means such as keyboard 29 and mouse 30, and output capability including speaker 31 and display 35. According to one or more embodiments of the present invention, a portion of system memory (e.g., RAM 24) and mass storage 34 collectively store an operating system such as the AIX® operating system from IBM Corporation to coordinate the functions of the various components shown in processing system 900.

One or more embodiments of the present invention can be implemented on cloud computing. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 10, illustrative cloud computing environment 50 is illustrated. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N can communicate. Nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
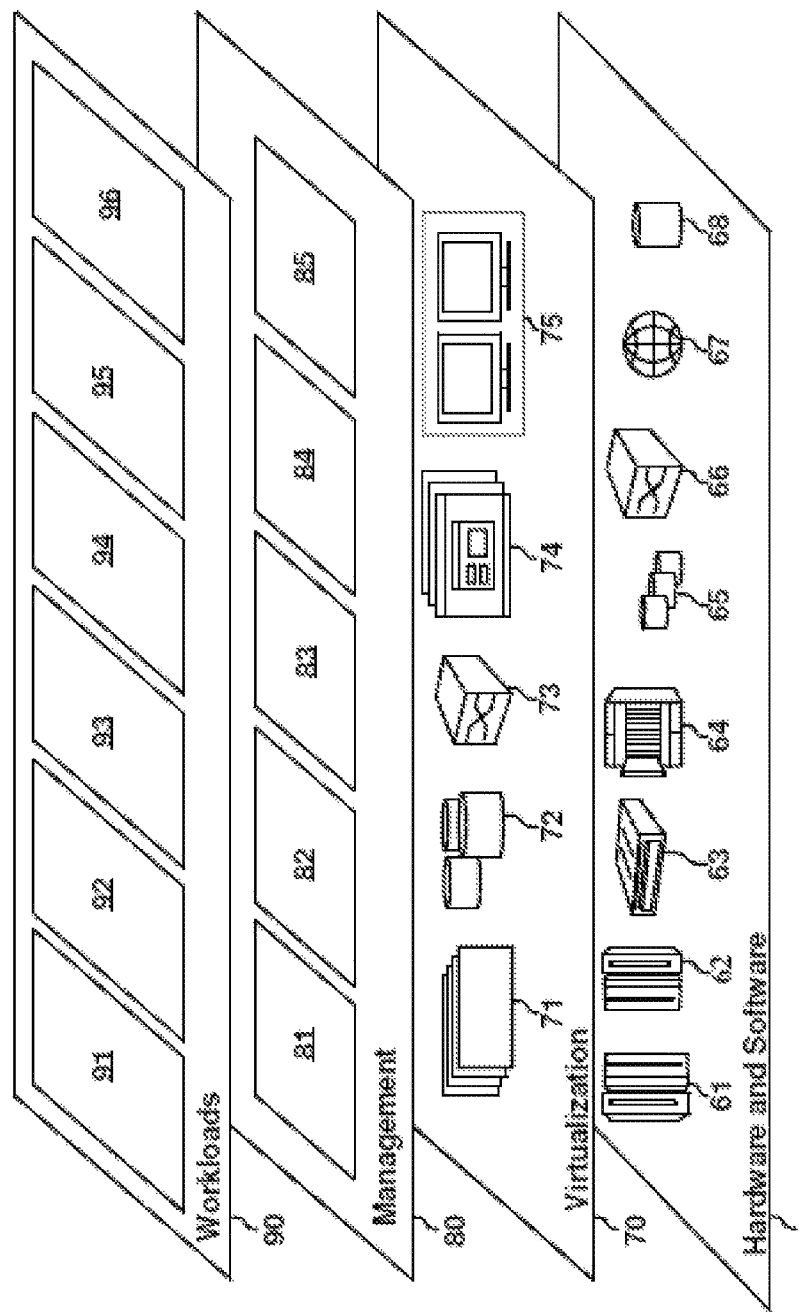
FIG. 11 depicts abstraction model layers according to one or more embodiments of the present invention.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As illustrated, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, management layer 80 can provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources can comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; transaction processing 95; and collaborative adaptive machine learning 96.

The present techniques can be implemented as a system, a method, and/or a computer program product. The computer program product can include a computer readable storage medium (or media) having computer readable program instructions thereon for causing a processor to carry out aspects of one or more embodiments of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of one or more embodiments of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some examples, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of one or more embodiments of the present invention.

Aspects of one or more embodiments of the present invention are described herein with reference to flowchart illustrations and/or block diagrams of methods, apparatus (systems), and computer program products according to one or more embodiments of the present invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various aspects of one or more embodiments of the present invention. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described techniques. The terminology used herein was chosen to best explain the principles of the present techniques, the practical application or technical improvement over technologies found in the marketplace, or to enable others of ordinary skill in the art to understand the techniques disclosed herein.

What is claimed is:

1. A computer-implemented method for adaptive object recognition for a target visual domain given a generic machine learning model, the method comprising:
   receiving, by a first processing device, image features and label selections extracted by a second processing device, wherein the image features and label selections are associated with a target visual domain;
   creating, by the first processing device, an adapted model and identifying classes of the target visual domain using the generic machine learning model, wherein the adapted model is trained using the image features and label selections;
   creating, by the first processing device, a domain-constrained machine learning model based at least in part on providing domain information the generic machine learning model, such that the domain-constrained machine learning model is trained to recognize the identified classes of the target visual domain; and
   computing, by the first processing device, a recognition result based at least in part on combining predictions of the domain-constrained machine learning model and the adapted model,
   wherein combining the predictions further comprises inputting an object image into the domain-constrained machine learning model, wherein, for the object image, the domain-constrained machine learning model generates an output prediction vector,
   wherein, for the object image, the domain-constrained machine learning model performs the following:
      generating an output prediction vector represented by the probabilities of that object image belonging to a recognizable class, and
      normalizing each of the probabilities, respectively, wherein the normalizing is performed using the following formula:

$$P_{dc\text{-}deep}(i) = \frac{p_i}{\sum_{n \in D} p_n}, \forall i \in D,$$

where P is a domain constrained output prediction vector, D is a set of object classes, and p is a probability of an object image belonging to a recognizable class.

2. The computer-implemented method of claim 1, wherein combining the predictions further comprises performing a linear interpolation.

3. The computer-implemented method of claim 2, wherein the linear interpolation is performed based at least in part on the output prediction vector of the adapted model and the output prediction vector of the domain-constrained machine learning model.

4. The computer-implemented method of claim 2, wherein combining the predictions further comprises computing a fused prediction as a probability of a particular object belonging to an object class of the target visual domain based at least in part on the linear interpolation.

5. The computer-implemented method of claim 1, further comprising:
   receiving an adaptation task that describes containing a contextual specification of the target visual domain;
   creating a domain-constrained machine learning model based at least in part on providing machine learning features and labels associated with the target visual domain to the generic machine learning model,
   wherein the domain-constrained machine learning model is created by constraining the domain of a generic machine learning model.

6. The computer-implemented method of claim 1, wherein combining the predictions is performed without training a separate domain-specific constrained machine learning model.

7. The computer-implemented method of claim 1, wherein combining the predictions further comprises inputting features extracted from an object image into the domain-constrained machine learning model.

8. A computer-implemented method for adaptive object recognition for a target visual domain given a generic machine learning model, the method comprising:
   receiving, by a first processing device, image features and label selections extracted by a second processing device, wherein the image features and label selections are associated with a target visual domain;
   creating, by the first processing device, an adapted model and identifying classes of the target visual domain using the generic machine learning model, wherein the adapted model is trained using the image features and label selections;
   creating, by the first processing device, a domain-constrained machine learning model based at least in part on providing domain information the generic machine learning model, such that the domain-constrained machine learning model is trained to recognize the identified classes of the target visual domain; and
   computing, by the first processing device, a recognition result based at least in part on combining predictions of the domain-constrained machine learning model and the adapted model,
   wherein combining the predictions further comprises inputting an object image into the domain-constrained machine learning model, wherein, for the object image, the domain-constrained machine learning model generates an output prediction vector,
   wherein, for the object image, the domain-constrained machine learning model performs the following:
      generating an output prediction vector represented by the probabilities of that object image belonging to a recognizable class, and
      normalizing each of the probabilities, respectively, wherein the normalizing is performed using the following formula:

$$P_{fused}(i) = aP_{dc\text{-}deep}(i) + (1-a)P_{shallow}(i), \forall i \in D,$$

where P is a domain constrained output prediction vector, D is a set of object classes, and a is determined through experimentation.

\* \* \* \* \*